June 28, 1932.   J. T. VARDEN   1,864,683
SEAL FOR SHAFTS
Filed Sept. 17, 1929

INVENTOR
John T. Varden
BY
ATTORNEY

Patented June 28, 1932

1,864,683

UNITED STATES PATENT OFFICE

JOHN T. VARDEN, OF LOS ANGELES, CALIFORNIA

SEAL FOR SHAFTS

Application filed September 17, 1929. Serial No. 393,201.

My invention relates to and has for a purpose the provision of a seal particularly adapted, although not necessarily, for the crankshafts of refrigerating compressors, and by which the escape from the compressor around the shaft of fluids such as dangerous or valuable gases for example, will be effectively prevented.

It is the present practice in refrigerating compressors to provide a shoulder on the crankshaft against which a seat of a sealing device through which the shafts extends, is normally urged to form a seal against the escape of gases from the compressor around the shaft. With this method of sealing, and when wear occurs on the shoulder of the crankshaft and permits leakage, it is necessary that the crankshaft be removed from the compressor and the shoulder ground or faced to again render it smooth and true so that the necessary seal will again be provided. This operation is both expensive and time consuming; and in order to reduce wear on the crankshaft shoulder to a minimum, the crankshaft is usually hardened which further increases the expense.

In the association of my seal with the crankshaft of a refrigerating compressor, wear on the crankshaft shoulder is positively prevented, so that the crankshaft need not be hardened, and when the seal is no longer effective due to wear thereon, it can be readily removed and a new one substituted without disturbing the crankshaft, thus resulting in a material saving in time and expense.

A further purpose of my invention is to provide a sealing element wherein provision is made for lubricating the confronting surfaces of the sealing element and the seat of the sealing device on which the sealing element rotates, so that wear on these parts is reduced to a minimum and the replacement thereof required only at long intervals.

I will describe only one form of seal for shafts embodying my invention and will then point out the novel features thereof in claims.

Figure 1:
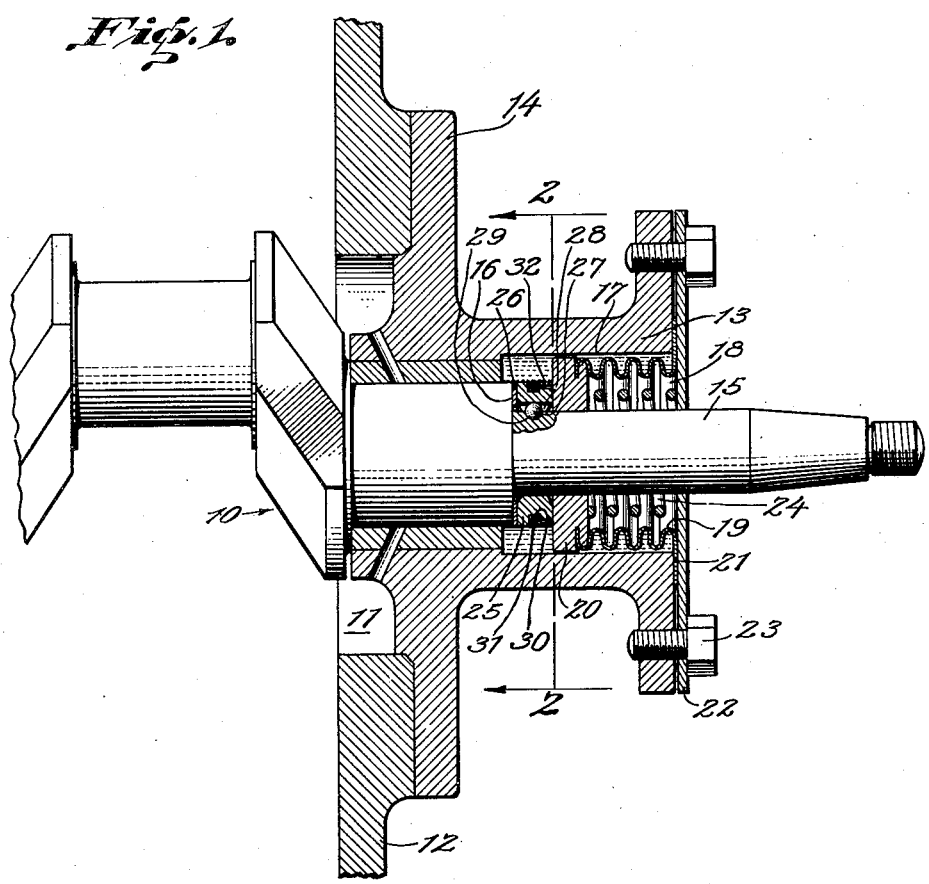
Figure 2:
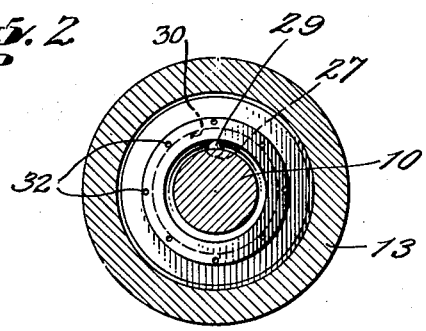

In the accompanying drawing,

Figure 1 is a view showing in vertical section a portion of a conventional refrigerating compressor with one form of sealing element embodying my invention applied to the crankshaft of the compressor, and Figure 2 is a transverse sectional view taken on the line 2—2 of Figure 1 and looking in the direction of the arrows.

Referring specifically to the drawing in which similar reference characters designate similar parts in each of the several views, my invention in its present embodiment is shown associated with the crankshaft 10 of a refrigerating compressor. One end of the shaft extends through an opening 11 in the crankcase 12 of the compressor and is journaled in a bearing 13 formed in a housing 14 secured to the crankcase. The outer end of the shaft 10 beyond the bearing 13 is reduced in diameter as indicated at 15 to form an annular shoulder 16 on the shaft which is originally ground or faced so as to be exactly at right angles to the longitudinal axis of the shaft.

The reduced portion 15 of the shaft extends freely through a pocket 17 formed in the housing, and in the pocket is a sealing device 18 including a metallic bellows 19 disposed in surrounding relation to the shaft. The inner end of the bellows 19 is provided with a sealing seat 20 in the form of a metallic disk freely receiving the shaft, whereas the outer end of the bellows terminates in a flange 21 which is clamped between the outer face of the housing 14 and a plate 22 by means of bolts 23 so as to provide a seal preventing the escape of gases from the crankcase of the compressor around the bellows. The seat 20 is normally urged towards the shoulder 16 of the crankshaft by means of a coil spring 24 surrounding the reduced portion 15 of the shaft and interposed between the seat and the plate 22.

In conventional installations the seat 20 is normally urged by the spring 24 into direct engagement with the shoulder 16 to provide a seal against the escape of gas from the compressor between the seat and shaft. However with the use of my sealing element, it is interposed between the seat and shoulder, and in the present instance comprises a hardened metallic ring 25 freely receiving the reduced portion 15 of the shaft 10, and having its opposed side faces ground perfectly smooth and true. One side face of the ring abuts the seat 20, whereas its opposite side face either directly abuts the shoulder 16 or a relatively thin gasket 26 which may or may not be provided.

The ring 25 and the reduced portion 15 of the shaft 10 are provided with mating keyways 27 and 28 respectively, receiving a key 29 in the form of a metal ball so that the ring will be fixed to the shaft for rotation therewith, yet will be free to slide longitudinally of the shaft and thereby permit the spring 24, under its urging action to clamp the ring between the shoulder 16 and seat 20 and thus effectively seal the joints between the confronting surfaces of the shoulder, ring and seat against the escape of gases from the crankcase of the compressor, yet permit the unrestricted rotation of the shaft.

As the ring is fixed to the shaft and thus rotates therewith, wear on the shoulder 16 of the shaft will be prevented and will only occur on the confronting surfaces of the ring and the seat 20. When such wear occurs as will render the ring ineffective to provide the necessary gas tight seal, it can be readily removed and a new ring and sealing device 18 substituted without disturbing the crankshaft, by simply removing the bolts 23 and plate 22 so that access can be had to the sealing device and ring.

In order to reduce to a minimum the wear on the confronting surfaces of the ring and seat, the ring is provided with an annular peripheral recess 30 receiving a wick 31 which becomes saturated with oil leaking into the pocket 17 from the crankcase of the compressor, and delivers the oil to the confronting surfaces of the ring and seat through ducts 32 in the ring, opening to the groove 30 and to that side face of the ring confronting the seat. The wick also functions to filter the oil and thus positively prevents any particles of foreign matter in the oil from reaching and scoring the contacting surfaces of the ring and seat.

Although I have herein shown and described only one form of seal for shafts embodying my invention, it is to be understood that various changes and modifications may be made therein without departing from the spirit of the invention and the spirit and scope of the appended claims.

I claim:

1. In combination, a rotatably mounted shaft having a shoulder thereon, a sealing seat receiving the shaft, a sealing element mounted on the shaft and interposed between said shoulder and seat, means for maintaining the sealing element in sealing engagement with said shoulder and seat, and means for lubricating the contacting surfaces of the sealing element and seat, comprising a peripheral recess in the sealing element, a wick in the recess adapted to be supplied with lubricant, and ducts in the sealing element communicating with the recess and with that surface of the sealing element engaging said seat, through which lubricant from the wick is adapted to be delivered to the contacting surfaces of the sealing element and seat.

2. In combination, a rotatably mounted shaft having a shoulder thereon, a sealing seat receiving of the shaft, a sealing element mounted on the shaft and interposed between said shoulder and seat, means for maintaining the sealing element in sealing engagement with said shoulder and seat, keyways in the sealing element and shaft, and a key in the keyways comprising a ball for securing the sealing element to the shaft for rotation therewith, yet rendering the sealing element slidable along the shaft under the action of the last means.

3. In combination, a rotatably mounted shaft having a shoulder thereon, a sealing seat receiving of the shaft, a sealing element mounted on the shaft and interposed between said shoulder and seat, means for maintaining the sealing element in sealing engagement with said shoulder and seat, means for securing the sealing element to the shaft for rotation therewith to prevent wearing of said shoulder by the sealing element during rotation of the shaft, and means for lubricating the contacting surfaces of the sealing element and seat, comprising a peripheral recess in the sealing element, a wick in the recess adapted to be supplied with lubricant, and ducts in the sealing element communicating with the recess and with that surface of the sealing element engaging said seat, through which lubricant from the wick is adapted to be delivered to the contacting surfaces of the sealing element and seat.

4. In combination, a rotatably mounted shaft having a shoulder thereon, a sealing seat fixed against rotation and receiving the shaft, a metallic sealing ring mounted on the shaft and interposed between said shoulder and seat, means for urging the seat towards the shoulder to force the confronting surfaces of the ring, shoulder and seat into sealing engagement with each other, means for fixing the ring to the shaft for rotation therewith so that during rotation of the shaft, the ring will rotate relatively to the seat, and means for lubricating the engaged surfaces of the ring and seat, comprising a peripheral recess in the sealing element, a wick in the recess adapted to be supplied with lubricant, and ducts in the sealing element communicating with the recess and with that surface of the sealing element engaging said seat, through which lubricant from the wick is adapted to be delivered to the contacting surfaces of the sealing element and seat.

5. In combination, a housing having a chamber therein, a shouldered shaft extending into the housing and through the chamberber, a longitudinally expansible bellows projecting into the chamber and through which the shaft extends, the bellows having a sealing seat receiving the shaft, means for detachably securing the bellows to the housing, a sealing ring receiving the shaft and interposed between the shoulder of the latter and the sealing seat, means for securing the sealing ring to the shaft for rotation therewith yet rendering the ring free to move longitudinally of the shaft, and means for urging the sealing seat into engagement with the sealing ring and the latter into engagement with the shaft shoulder, whereby to relieve the shaft shoulder of wear and to transfer the wear to the confronting surfaces of the sealing seat and ring, the sealing ring having means for conducting lubricant from the chamber to said surfaces of the sealing seat and ring.

6. In combination, a housing having a chamber therein, a shouldered shaft extending into the housing and through the chamber, a longitudinally expansible bellows projecting into the chamber and through which the shaft extends, the bellows having a sealing seat receiving the shaft, means for detachably securing the bellows to the housing, a sealing ring receiving the shaft and interposed between the shoulder of the latter and the sealing seat, means for securing the sealing ring to the shaft for rotation therewith yet rendering the ring free to move longitudinally of the shaft, and means for urging the sealing seat into engagement with the sealing ring and the latter into engagement with the shaft shoulder, whereby to relieve the shaft shoulder of wear and to transfer the wear to the confronting surfaces of the sealing seat and ring, the sealing ring having a peripheral recess and ducts communicating with the recess and that side face of the sealing ring confronting the sealing seat, through which lubricant is conducted from the chamber to said surfaces of the sealing seat and ring.

JOHN T. VARDEN.